United States Patent
Kimura

(10) Patent No.: US 8,453,501 B2
(45) Date of Patent: Jun. 4, 2013

(54) HEAT CONDUCTION-TYPE BAROMETRIC SENSOR UTILIZING THERMAL EXCITATION

(76) Inventor: Mitsuteru Kimura, Miyagi (JP)

( * ) Notice: Subject to any disclaimer, the term of this patent is extended or adjusted under 35 U.S.C. 154(b) by 200 days.

(21) Appl. No.: 13/060,183

(22) PCT Filed: Aug. 21, 2009

(86) PCT No.: PCT/JP2009/064658
§ 371 (c)(1), (2), (4) Date: May 17, 2011

(87) PCT Pub. No.: WO2010/021380
PCT Pub. Date: Feb. 25, 2010

(65) Prior Publication Data
US 2012/0118060 A1    May 17, 2012

(30) Foreign Application Priority Data
Aug. 22, 2008 (JP) ................... 2008-214713

(51) Int. Cl.
*G01L 7/20* (2006.01)
(52) U.S. Cl.
USPC .............................................. 73/384; 73/700
(58) Field of Classification Search
None
See application file for complete search history.

(56) References Cited

U.S. PATENT DOCUMENTS
5,208,187 A * 5/1993 Tsubouchi et al. ........... 438/607

FOREIGN PATENT DOCUMENTS

| JP | 4-304679 | 10/1992 |
|---|---|---|
| JP | 8-122107 | 5/1996 |
| JP | 2004-286492 | 10/2004 |
| JP | 2006-153782 | 6/2006 |
| JP | 2007-051963 | 3/2007 |
| JP | 2007051963 A * | 3/2007 |
| JP | 2008-111822 | 5/2008 |

OTHER PUBLICATIONS

Noriaki Takashima, Mitsuteru Kimura and Takayasu Shiokawa, "Expansion of the measurement range of the thin film vacuum sensor", Bulletin of Institute for Environmental Protection, Tohoku Gakuin University vol. 20, pp. 80-85 (Mar. 2009).
International Search Report, PCT/JP2009/064658, Sep. 29, 2009.

* cited by examiner

*Primary Examiner* — Lisa Caputo
*Assistant Examiner* — Jermaine Jenkins
(74) *Attorney, Agent, or Firm* — Young & Thompson

(57) ABSTRACT

A heat conduction type barometric sensor has high sensitivity and high accuracy that has simple structure and circuit configuration and can measure a barometric pressure in the range of a very low barometric pressure to $\geqq 1$ atm using one sensor chip. The sensor includes a cantilever-shaped thin film provided with a thin-film temperature sensor, a heating element, and an excitation element. The excitation element utilizes warpage and bending based on a difference in thermal expansion between two main layers constituting the thin film during intermittent heating by a thin-film heater as the heating element. The two main layers are a silicon layer and a thermally oxidized film of silicon which are significantly different from each other in the coefficient of thermal expansion. A circuit in which the sensitivity is enhanced by the integration of a seebeck current for a predetermined period of time can be also provided.

20 Claims, 11 Drawing Sheets

HEAT CONDUCTION-TYPE BAROMETRIC SENSOR UTILIZING THERMAL EXCITATION

TECHNICAL FIELD

The present invention relates to a heat conduction type barometric sensor capable of vibrating a heatable thin film that is thermally separated from a substrate. More particularly, the present invention relates to a heat conduction type barometric sensor that utilizes thermal excitation and can measure the broadband barometric pressure by using one sensor chip from extremely low barometric pressure to high barometric pressure, in particular, measure gas pressure including the degree of vacuum with high sensitivity by generating an air stream by forced convection by vibration even in a barometric pressure of 1 atm or higher.

BACKGROUND ART

In general, a heat conduction type sensor refers to a thermal type sensor comprising a temperature sensor and a heater, and obtaining physical information such as on barometric pressure, humidity, or flow velocity, etc. of an ambient medium by measuring temperature changes caused by heat conduction to the ambient medium, such as gas, etc., of an object, such as thin film or wire, etc., heated by a heater, using the temperature sensor. The heat conduction type barometric sensor which measures the pressure of the ambient gas, like the degree of vacuum and the like, from a temperature change in an object by heat conduction as above has a problem that, in general, with respect to the relation between the distance from the heated object to the heat sink and the mean free path of the gas, if the barometric pressure increases to around 1 atm from vacuum, there is hardly any change resulting from heat escape caused by heat conduction with respect to a change in barometric pressure, and thus sensitivity substantially become null.

The present inventors invented a heat conduction type barometric sensor capable of measuring gas pressure including the degree of vacuum with high sensitivity in a barometric pressure of 1 atm or even higher by facilitating heat escape from the heated thin film by generating an air stream by vibration using an electrostatic attraction as an excitation means vibrating the thin film of the thin film Pirani vacuum sensor as a heat conduction type barometric sensor (Patent Document 1). The present inventors used diode as a temperature sensor in a thin film state (Patent Document 2), and invented a current detection type thermocouple capable of detecting a short-circuit Seebeck current of a thermocouple (Patent Document 3). The present inventors invented using diode as thin film shape heater (Patent Document 4), and using a thermocouple as a heater (Patent Document 5). The present inventors invented a heat conduction type sensor measuring a flow velocity or the degree of vacuum by forming them as a cantilever-shaped thin film (Japanese Patent Application No. 2007-103611). The inventors invented a temperature sensor capable of detecting temperature difference with high sensitivity and high accuracy by integrating a Seebeck current for a predetermined amount of time (Japanese Patent Application No. 2009-188088).

PRIOR ART REFERENCE (Patent Document 1) Japanese Patent Laid-Open No. 2007-51963

(Patent Document 2) PCT/JP01/00080, U.S. patent application Ser. No. 10/169,083

(Patent Document 3) PCT/JP2006/322842

(Patent Document 4) Japanese Patent Laid-Open No. 2006-250736

(Patent Document 5) Japanese Patent Laid-Open No. 2009-79965

SUMMARY

The present invention provides a heat conduction type barometric sensor capable of measuring the broadband barometric pressure with high sensitivity and high accuracy, which has simple sensing part with a simple structure and a driving circuit configuration, in addition to making it possible to combine the above inventions.

However, a conventional heat conduction type barometric sensor measuring barometric pressure around 1 atm used electrostatic attraction as an excitation means for vibrating a thin film. Thus, it required an electrode for excitation to be formed close to the thin film, and had a complex structure and thus was difficult to manufacture.

Also, a conventional excitation means for vibrating a thin film used resonance, and could obtain wide amplitude with low power, and thus was appropriate for generating big air streams. However, it required an excitation timing to match, and had a complex circuit for phase adjustment, etc. Thus, a sensor with a simpler structure which does not necessarily have to use resonance but has a simple circuit configuration has been required.

The subject matter of the present invention is to provide a heat conduction type barometric sensor utilizing thermal excitation that uses a cantilever structure or a diaphragm in a simple structure without using resonance, which is capable of measuring barometric pressure from high vacuum regions to regions of 1 atm or higher.

The present invention is to solve the problems described above. The heat conduction type barometric sensor according to claim 1 of the present application comprises on a thin film that is thermally separated from a substrate, at least one thin-film temperature sensor, a heating means for heating the thin film, and an excitation means that vibrates the thin film, the heat conduction type barometric sensor characterized in that the thin film consists of two or more thin-layers that have at least different expansion coefficients, the excitation means utilizes warpage and bending based on a difference in thermal expansion between two main layers constituting the thin film during intermittent heating by the heating means, and by way of forced convection based on the warpage and bending, a heat conduction from the heating means to an ambient gas is facilitated so that temperature change of the thin-film temperature sensor is increased, and the increased temperature change enhances measuring sensitivity to barometric pressure to be measured.

For example, like bimetal, as for a cantilever-type thin film that is thermally separated from a substrate consisting of at least two layers having significantly different coefficients of thermal expansion, when the thin film is heated with Joule heating, etc. of a thin-film heater formed on the thin film, the layer of the thin film having a larger coefficient of thermal expansion further extends, and thus the thin film warps and bends. When the thin film is heated continuously, the temperature increase is saturated, and thus warpage and bending become stable. However, when heating is stopped, the thin film cools down, and returns to its original temperature, and thus the warpage and bending return to the condition before the thin film was heated. As such, while the thin film is heated and cooled, warpage and bending are repeated, and thus the thin film vibrates. When an air stream is generated by vibration of ambient gas like that, it is necessary to intermittently repeat heating and cooling by using the difference in coefficient of thermal expansion of the thin film consisting of at least two layers of a cantilever, etc. that is thermally separated from the substrate (levitated) as an excitation means.

For the cycle of intermittent heating and cooling is appropriate the thermal time constant of thin film heating. This cycle does not necessarily have to match the cycle of resonance frequency of a thin film.

In the heat conduction type barometric sensor according to claim 2 of the present application, the thin film has a cantilever shape.

In case the thin film that is thermally separated from the substrate has a cantilever shape, the front side of the cantilever is thermally separated completely from the substrate, and only is in contact with the ambient gas, which is the barometric pressure to be measured. Thus, for example, at an end portion of a cantilever shape, heat from a thin-film heater formed at the substrate side of the cantilever shape cannot help but escape because the heat is conducted to ambient gas (radiant heat transmission can be almost ignored because it is small at a temperature of 500 K or lower). Thus, in a very high vacuum (substantially at a barometric pressure of $10^{-4}$ Pa or lower), the temperature difference is zero at two points on the temperature sensor formed at an end portion of a cantilever shape. As such, the null method, which is a method of measurement using zero as the reference point, can be employed when measuring the change of barometric pressure with high accuracy by measuring a temperature difference. Thus, if a thin film has a cantilever shape, a heater for heating is placed close to the substrate support side of the cantilever, and the temperature difference between two points is measured by two temperature sensors (there may be only one sensor in a temperature difference sensor) formed in the longitudinal direction toward the end portion of the cantilever; since it is known that the temperature difference between these two points is substantially zero at a high degree of vacuum (very low barometric pressure), barometric pressure can be measured with high accuracy at a high degree of vacuum with the null method.

Meanwhile, in a high barometric pressure region (a region of 0.1 atm or more) where the effect of forced convection by the vibration of the thin film can be obtained, it is preferable to measure a barometric pressure from the temperature difference between the two temperature sensors formed at an end portion of a cantilever shape immediately after the heating of the thin-film heater is stopped.

In the heat conduction type barometric sensor according to claim 3 of the present application, a thermocouple is used as a temperature sensor.

Here, the thermocouple is a temperature difference sensor which essentially detects a temperature difference only, and thus, appropriate for measuring the temperature difference between the two points of the above described cantilever shape. In particular, when operating it as a current detection type thermocouple, it is possible to measure the temperature difference with high sensitivity and with a simple configuration.

In the heat conduction type barometric sensor according to claim 4 of the present application, the thin film comprises two main layers of silicon layer and silicon oxide layer, and the heat conduction type barometric sensor uses a difference in thermal expansion coefficients between the silicon layer and the silicon oxide layer.

For the at least two cantilever-shaped layers which have significantly different coefficients of thermal expansion, a silicon layer (Si layer) such as SOI layer, etc. and a silicone oxide layer (BOX layer) of the lower part of the SOI layer are used. In general, the silicon oxide layer (BOX layer) of SOI layer is a quartz thin film and has a very small coefficient of thermal expansion. Thus, if the SOI layer to which a BOX layer is adhered is formed as a cantilever, because the SOI layer (Si layer) is fixed in an elongated state at a high temperature when an SOI substrate is formed, when the SOI layer has become physically free as a cantilever, it is contracted at room temperature, and the cantilever is tilted backwards to the SOI layer. Thus, in many cases, the SOI layer is elongated in balance by growing a silicon oxide film on the surface of the SOI layer opposite to the BOX layer so that the cantilever is not bent. In the present invention, when growing a silicone oxide film on the surface of the SOI layer opposite to the BOX layer, the silicone oxide film is grown to be sufficiently thinner than the BOX layer so that warpage and bending remain, thereby increasing a bimetal effect by thermal expansion, and warpage and bending in the present invention change significantly when the thin film is heated by a heating means.

In the heat conduction type barometric sensor according to claim 5 of the present application, a thin-film heater is used as a heating means.

For a thin-film heater, a metal thin film, a diffusion resistance or a thermocouple which is temperature difference sensor and has resistance can be used as a heater. In addition, the thin film can be heated by the forward direction current of a diode having a junction such as a pn junction, etc. It can also be used as a thin-film heater by using collector resistance of a transistor.

In the heat conduction type barometric sensor according to claim 6 of the present application, a thin-film heater is formed in the thin film thermally separated from the substrate at a position closer to the substrate support portion than the temperature sensor.

When the thin-film heater has the same dimensions, if the thin-film heater is formed close to the substrate support portion of the thin film that is thermally separated from the substrate, the warpage and bending of the thin film that is thermally separated from the substrate according to the coefficients of thermal expansion of the two layers becomes larger, and if the thin film that is thermally separated from the substrate is in the shape of a cantilever, change in warpage and bending is more noticeable. Accordingly, forced convection based on warpage and bending increases, and thus the change in barometric pressure of the ambient gas can be measured with high sensitivity. Also, according to an experiment, the effect of forced convection based on warpage and bending is remarkable at a barometric pressure of 0.1 atm ($0.1 \times 10^5$ Pa) or higher.

In the heat conduction type barometric sensor according to claim 7 of the present application, a conductor having a not more than 1,000 ppm/K of temperature coefficient of resistance is used as a thin-film heater.

In order to secure a predetermined increment of temperature by applying a constant power, it is preferable to use a metal thin film having a low temperature coefficient of resistance. The reason is: If the temperature coefficient of resistance is low, the change in resistance of the heater caused by increase of temperature can be ignored; thus, when the thermal conductance of the thin film that is thermally separated from the substrate is constant, temperature increases in proportion to the power supplied; thus, constant power can be supplied by simply applying a constant voltage or current to the heater. As such, theoretically it is known that if a heater of the same consumption power is used, the temperature increments of the thin film that is thermally separated from the substrate are same with respect to the ambient temperature. That is, even if the ambient temperature changes, a constant temperature increments are obtained with respect to the ambient temperature. In many cases, a Joule heating heater used as a thin-film heater is required to consume the same amount of power even in repeated heating. If the temperature coefficient of resistance (TCR) of a thin-film heater is very low and the level of change in the electric resistance of the heater by heating can be ignored, it is possible to supply a constant power by applying a constant voltage or constant current, and thus a predetermined temperature increase of the heater can be expected. However, as for heaters having a high temperature coefficient of resistance (TCR), since the resistance value varies while temperature increases, and resistance value differs even if the ambient temperature is different, it is difficult to supply a constant power. Thus, for a thin-film heater, it is preferable to use a conductor having a temperature coefficient of resistance (TCR) not more than 1,000 ppm/K, and if possible, it is preferable to use one for which the change in resistance can be ignored because its temperature coefficient of resistance (TCR) is low enough to be ignored at the temperature at which it is used. For example, nichrome (NiCr) thin film, etc. has a temperature coefficient of resistance (TCR) of several tens ppm/K, and thus is a preferable material.

In the heat conduction type barometric sensor according to claim 8 of the present application, a thermocouple is also used as a heater for the thin-film heater.

The thermocouple is a temperature difference sensor detecting a temperature difference using a junction of two different conductors and an electromotive force based on temperature difference, and since conductors have resistance, the thermocouple can be used as a heater. In particular, in many cases, a current detection type thermocouple capable of measuring a short-circuit current by an electromotive force based on temperature difference uses a semiconductor having large electromotive force as one side conductor. The junction of two different conductors is an Ohmic junction, which can generate heat by the resistance of a semiconductor constituting the thermocouple. In case of using the SOI layer as a thin film that is thermally separated from the substrate, the SOI layer can be used as a main thin-film heater. In particular, as for a cantilever structure using the SOI layer, since the end portion is thermally separated from the substrate, it is easy to increase the temperature significantly.

In the heat conduction type barometric sensor according to claim 9 of the present application, the thin film thermally separated from the substrate is divided into at least two of thin film (A) and thin film (B) by intervening of a thermal resistance part, each of the thin film (A) and the thin film (B) is provided with a thin-film temperature sensor (THA) and a thin-film temperature sensor (THB), respectively, and barometric pressure is measured from the temperature difference between the thin-film temperature sensor (THA) and the thin-film temperature sensor (THB).

The thin film that is thermally separated from the substrate has a cantilever structure, and the thin-film heater is configured halfway through the cantilever including an area close to the substrate, which is a support portion, or an area leading to the cantilever from the substrate. Also, on the area closer to the end portion of the cantilever than the thin-film heater, the cantilever structure is divided into the two thin film (A) and thin film (B) by intervening between them the thermal resistance part. The constitution of measuring the temperature difference by forming a thin-film temperature sensor (THA) and a thin-film temperature sensor (THB) respectively at the two thin film (A) and thin film (B) divided as above is important for extending the range of measuring the barometric pressure from very low barometric pressure to high barometric pressure of 1 atm or higher.

In the heat conduction type barometric sensor according to claim 10 of the present application, thermocouples are used for both of the thin-film temperature sensor (THA) and the thin-film temperature sensor (THB).

The present invention measures the temperature difference between two areas of the thin film that has cantilever structure and is thermally separated from the substrate (the thin film is levitated at the end portion of the cantilever structure). Said two areas are formed by intervening the thermal resistance in the thin film in a longitudinal direction. The temperature difference results from the heat from the thin-film heater that is formed at position close to the substrate. The present invention measures the barometric pressure of the ambient gas to be measured from the temperature difference output. The main point of the present invention is to extend the temperature difference by promoting forced convection heat transmission by forced vibration at high barometric pressure, in particular, high barometric pressure of 0.1 atm or higher. In order to measure the temperature difference, it is most preferable to use a temperature difference sensor producing outputs only based on essential temperature differences. As a temperature difference sensor, it is preferable to use a thermocouple that has a simple structure and can be made a thin film, and it is preferable to use thermocouples for both the thin-film temperature sensor (THA) and thin-film temperature sensor (THB). Also, preferably, the thin film that is thermally separated from the substrate has a cantilever structure. As a conductor at one side of the thin film, it is possible to use an SOI layer (semiconductor layer) of the SOI substrate, and in order to use warpage and bending caused by the difference in coefficient of thermal expansion as an excitation means, it is preferable to use a double structure layer with a BOX layer ($SiO_2$ film layer) having a very small coefficient of thermal expansion, because it has a simple structure. Also, as a conductor at another side of the thin film, it is sufficient to use a metal thin film with an insulating layer intervening in it, and if possible, it is preferable to select a metal thin film generating thermo electromotive force opposite to that of the SOI layer (semiconductor layer).

In the heat conduction type barometric sensor according to claim 11 of the present application, in a low barometric pressure region having no effect of forced convection by the vibration of a thin film, a barometric pressure is measured from the temperature difference between the thin-film temperature sensor (THA) and the thin-film temperature sensor (THB) in the heating state of the thin-film heater, and in a high barometric pressure region having effect of forced convection by the vibration of the thin film, a barometric pressure is measured from the temperature difference between the thin-film temperature sensor (THA) and the thin-film temperature sensor (THB) in the state immediately after heating operation of the thin-film heater is ceased.

A low barometric pressure region where the effect of convection by vibration of the thin film cannot be obtained is in a vacuum state of barometric pressure around 0.1 atm or lower. In very high vacuum (very low barometric pressure), in particular, in case the thin film that is thermally separated from the substrate has a cantilever structure, in this thin film, the temperature difference between the two thin-film temperature sensor (THA) and thin-film temperature sensor (THB) formed closer to the end portion than the thin-film heater is essentially close to zero even when the thin film is heated. Thus, very low barometric pressure can be measured with high accuracy using the null method. However, in a high barometric pressure region having a barometric pressure of 0.1 atm or higher where the effect of forced convection by the vibration of a thin film can be had, cooling is facilitated in the present invention by forced convection generated in the ambient gas by an excitation means, and thus it is possible to measure the barometric pressure when the cantilever structure body, which uses a vibration (almost one vibration) based on thermal expansion of two layers having different expansion coefficients, starts vibrating after heating is started. However, according to an experiment, the temperature difference caused by the forced convection of the thin-film temperature sensor (THA) and thin-film temperature sensor (THB) formed with the thermal resistance part in between can be measured with high sensitivity and high accuracy with the heating stopped and by using vibration (almost one vibration) during the process of cooling, because a signal to noise ratio (S/N ratio) and a change in a temperature difference signal according to a change in barometric pressure become large. In case of stopping heating and using vibration during the process of cooling, the temperature of the thin-film temperature sensor (THA) formed on the substrate side of the cantilever (formed closer to the end portion than the thin-film heater) cools fast, and the temperature of the thin-film temperature sensor (THB) formed with the thermal resistance part between them cools slowly. Thus, after the temperature difference reaches its peak, as cooling proceeds, the temperature difference between the thin-film temperature sensor (THA) and the thin-film temperature sensor (THB) gets close to zero, and thus the signal output gets close to zero as well. Accordingly, the null method can be used, and measurement with high sensitivity and high accuracy is possible.

In the heat conduction type barometric sensor according to claim 12 of the present application, at least part of circuits required for operation of the heat conduction type barometric sensor is integrated in the substrate.

The heat conduction type barometric sensor comprises on the thin film that is thermally separated from the substrate, at least one thin-film temperature sensor, a heating means increasing the temperature of the thin film, and an excitation means vibrating the thin film. In order to operate them for output, various circuits are required. All or some of the circuits may be integrated on the substrate. For example, in case of using a semiconductor such as silicon (Si), etc. as a substrate, an amplifier amplifying an output signal from the temperature sensor, a driving circuit of a heating means such as a thin-film heater, etc., a circuit for timing of an excitation means, an operational circuit, a display circuit, etc. can be integrated on the same substrate. Accordingly, it is possible to provide a small size, light and compact heat conduction type barometric sensor.

In the heat conduction type barometric sensor according to claim 13 of the present application, a cap provided with mesh or holes covers at least the temperature sensor and the heating means formed on the substrate such that it does not seal up but only disturbs flow of ambient gas, and therefore gas flow has no direct contact with the temperature sensor and the heating means.

The heat conduction type barometric sensor is sensitive to air stream. For example, in case of using it as a vacuum sensor, an air stream is generated when vacuum exhaust is made using a pump. In this case, if the air stream directly contacts with the temperature sensor and the heater as a heating means constituting the heat conduction type barometric sensor, it becomes difficult to measure the barometric pressure. Thus, it is necessary to prevent the air stream from directly contacting the temperature sensor and the heater, and cover the heater and the temperature sensor, which are the barometric pressure sensing part of the heat conduction type barometric sensor, with a cap having mesh or holes. The cap with mesh or holes may cover the entire substrate.

In the heat conduction type barometric sensor according to claim 14 of the present application, an output of the temperature sensor is set to be an output current, the output current is integrated during a predetermined period of time to be converted to an output voltage, and the output voltage is used for obtaining barometric pressure to be measured.

In case of measuring a short-circuit Seebeck current by using a current detection type thermocouple as a temperature sensor, or in case of converting an electromotive force to a current as an output signal even when detecting the electromotive force, if these output currents I are used to charge a condenser C, etc., the product of multiplying the output current I by charging time $\Delta t$ becomes the electric charge Q stored in the condenser C. At this time, the voltage V (output voltage) at both ends of the condenser C is $V=Q/C=I\Delta t/C$, and by selecting a suitable condenser C value, a large output voltage V can be easily obtained with large S/N ratio. For example, by storing a Seebeck current signal based on the temperature difference between the thin-film temperature sensor (THA) and thin-film temperature sensor (THB) into the condenser C using an operational amplifier for a predetermined period of time, e.g., 20 milliseconds, immediately after stopping the heater of the heat conduction type barometric sensor and initiating the vibration of the cantilever-shaped thin film, the sensitivity to the barometric pressure can be further enhanced by converting the signal into large output voltage V.

In the heat conduction type barometric sensor according to claim 15 of the present application, various circuits required for operating the heat conduction type barometric pressure sensor, i.e., a temperature control circuit for controlling the temperature of the heating means, an excitation driving circuit for driving the excitation means, an amplifying circuit for amplifying a signal from the temperature sensor, and an operation circuit for converting an output of the amplifying circuit into barometric pressure are also incorporated. These circuits do not necessarily have to be mounted on the substrate, and may be equipped in the form of an apparatus to operate the heat conduction type barometric sensor.

The thin film that is thermally separated from the substrate has a structure where at least two layers having different coefficients of thermal expansion are stacked up like bimetal, so that intermittent heating by the heating means causes bimorph vibration and they become an excitation means. Thus, the heat conduction type barometric sensor of the present invention has an advantage of providing a heat conduction type barometric sensor of low cost and high sensitivity with a simple structure suitable for mass production.

If there is a change in the barometric pressure including vacuum, then the resonance frequency would change. Thus, when using resonance, a self-oscillation circuit or phase detection and adjustment are required. The heat conduction type barometric sensor of the present invention can use resonance, but does not necessarily have to use resonance, and simply repeating heating and cooling in consideration of the thermal time constant of the thin-film heater may be enough, and thus it has the advantage of requiring only a simple circuit configuration.

In the heat conduction type barometric sensor of the present invention, the thin film thermally separated by the MEMS technology of silicon (Si) substrate generally uses an SOI substrate. Thus, it can use two layers of an SOI layer and a BOX layer (SiO$_2$ layer) of an SOI substrate, and thus does not have to newly form a particular structure or material. Thus, it can combine two layers of Si having a very high coefficient of thermal expansion and a layer of very low coefficient of thermal expansion by constituting a thin film that is thermally separated from a substrate mainly consisting of two layers of silicon (Si) and silicon oxide layer (SiO$_2$), and thus the present invention can provide a heat conduction type barometric sensor with high sensitivity and with low cost.

In the heat conduction type barometric sensor of the present invention, the thin film that is thermally separated from the substrate is shaped as a cantilever. Significant vibration of the thin film is obtained by a combination of the heating means and the excitation means. As such, there is another advantage that forced convection increases in proportion to the large vibration, which results in increase in sensitivity to barometric pressure.

In the heat conduction type barometric sensor of the present invention, the thin-film heater formed on the thin film that is thermally separated from the substrate is used as a heating means, and the thin-film heater can be positioned near the substrate support portion. Thus, there is another advantage that large vibration of the thin film can be obtained.

In the heat conduction type barometric sensor of the present invention, because the temperature difference between the substrate and certain area of the thin film that is thermally separated from the substrate or the temperature difference between two areas divided by the intervention of the heat resistance part in the thin film is measured, a simple thermocouple can be used as a temperature difference sensor. Further, owing to this, the null method of temperature difference can be applied. Thus, barometric pressure can be measured with high precision.

In the heat conduction type barometric sensor of the present invention, as a material having a low temperature coefficient of resistance is used for the thin-film heater, the variation of resistance depending on the temperature of the thin-film heater can be ignored; thus, there is another advantage that a predetermined increment in temperature compared to ambient temperature can be easily achieved by a constant current driving or constant voltage driving. Generally, a heated object returns to ambient temperature when the heating ceases. Thus, it is important to specify a predetermined increment in temperature compared to ambient temperature. As such, a predetermined increment in temperature can be set to be constant easily and with a simple structure. Thus, the heat conduction type barometric sensor that does not depend on the ambient temperature can be provided.

In the heat conduction type barometric sensor of the present invention, as a thin film that is thermally separated from a substrate is formed as a cantilever structure, in low barometric pressure region (generally 0.1 atm or lower) where there is no forced convention effect caused by the vibration of the thin film, a barometric pressure is measured from the temperature difference between the thin-film temperature sensor (THA) and the thin-film temperature sensor (THB) with the heat resistance part in between under the heating condition of the thin-film heater. In high-degree vacuum, the temperature difference between them will be zero. Thus, the null method can be applied.

Further, in a high barometric pressure region (generally 0.1 atm or higher) where there is forced convention effect caused by the vibration of the thin film, a barometric pressure is measured from the temperature difference between the thin-film temperature sensor (THA) and the thin-film temperature sensor (THB) during forced convention caused by the vibration immediately after ceasing of the heating of the thin-film heater. There are advantages that a high barometric pressure of 1 atm or higher can be measured, and that a heat conduction type barometric sensor that can measure a wide bandwidth in the range of very high vacuum (low barometric pressure) to high barometric pressure using a single sensor chip of the heat conduction type barometric sensor can be provided.

In the heat conduction type barometric sensor of the present invention, a cap covering the temperature sensor and the heating means, which are formed on the substrate, is configured not to seal but to disturb flow of ambient gas. Thus, there is another advantage that the influence of air stream during vacuum exhaust can be ignored.

In the heat conduction type barometric sensor of the present invention, the output of the temperature sensor is set to be an output current, the output current is integrated during a predetermined period of time using a condenser, etc. and is accordingly converted into an output voltage, and barometric pressure is measured by using the output voltage. Further, the electric charge of the condenser is discharged regularly so as to return to an initial state. Thus, there is another advantage that a simple heat conduction type barometric sensor with high sensitivity and high precision can be provided.

DETAILED DESCRIPTION FOR CARRYING OUT THE INVENTION

Figure 1:
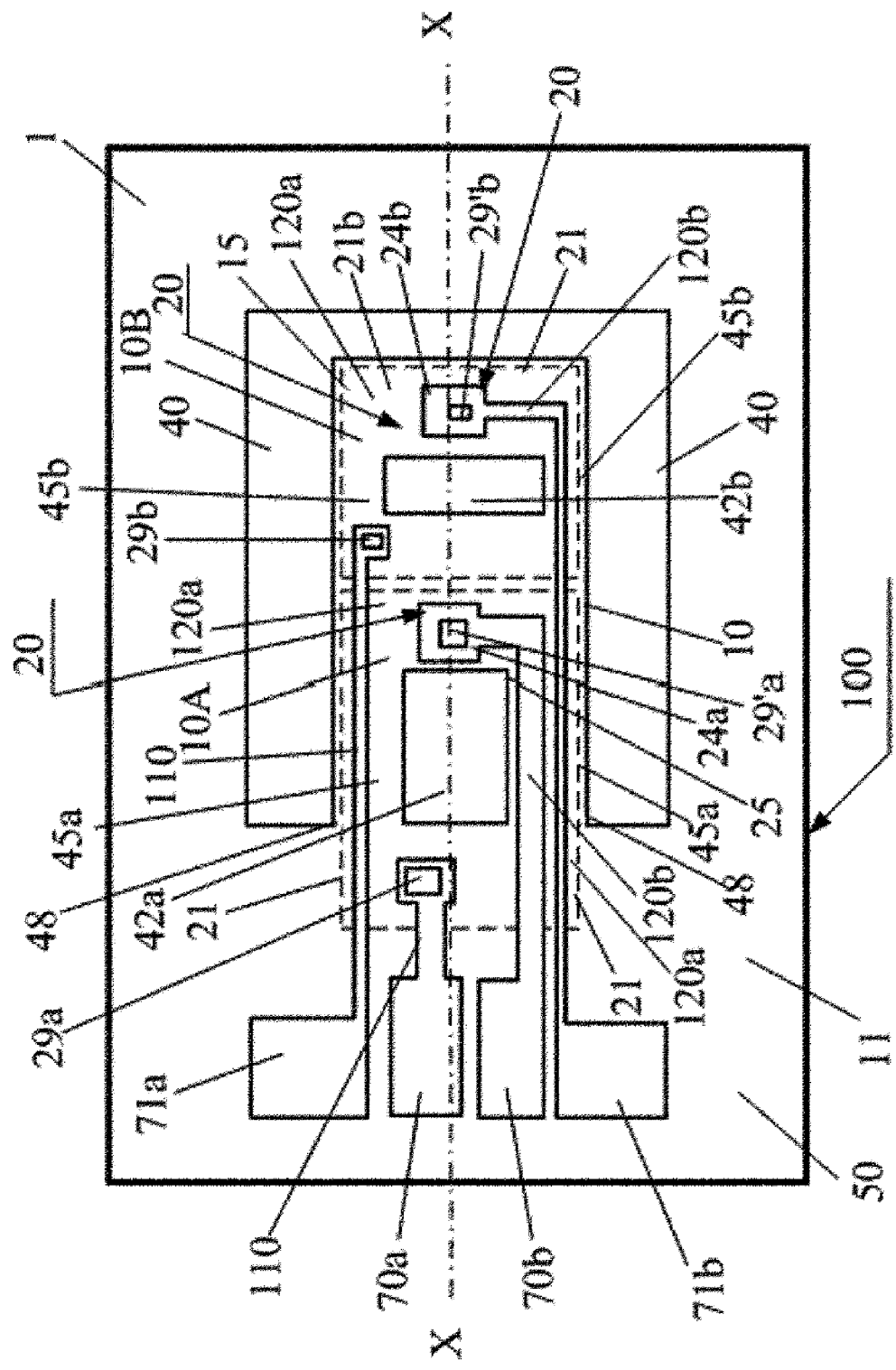
FIG. 1 relates to a heat conduction type barometric sensor according to the present invention and is a schematic plane view of an embodiment of a heat conduction type sensor chip 100 manufactured with a substrate 1 having an SOI layer 11, and further comprising a thin-film heater 25 as a thermocouple heater (First Embodiment).

The heat conduction type barometric sensor of the present invention comprises a thin film in the form of cantilever, which is thermally separated from the substrate by the MEMS technology. The thin film uses SOI substrate and has two main layers of a Si layer that is an SOI layer and a $SiO_2$ layer that is a BOX layer. A thin-film thermocouple, which is a temperature difference sensor, consisting of an n-type Si thin-film layer and a metallic thin film is used as a temperature sensor. An SOI substrate wherein a p-type SOI layer is prepared and then an n-type high concentration impurity is added to the Si layer that is the SOI layer, or an SOI substrate to which an n-type high concentration impurity is added from the beginning is used to form a low resistance n-type Si thin-film layer and a $SiO_2$ film thereon much thinner than the $SiO_2$ layer that is the BOX layer, and further to form a metallic thin film, such as nickel (Ni), etc. on the $SiO_2$ film. Thereby, a thin-film thermocouple, where a contact portion between an n-type Si thin film layer as one side conductor and a metallic thin film as another side conductor is formed at an end portion of the cantilever, is used.

In particular, it is desirable to use the thin-film thermocouple as the current detection type thermocouple that can be constituted with one thermocouple since it is highly sensitive. Also, a thermopile may be used instead of one thermocouple. A thin-film heater, for example, a nicrom thin-film heater, is formed close to the cantilever support portion with respect to the temperature sensor as a heating means.

Also, a thin-film thermocouple may be used as a heating means. For example, close to the cantilever support portion, another thin-film thermocouple may be prepared to use as a thermocouple for detecting a reference temperature of said thermocouple for detecting a temperature change at an end portion of the cantilever (the temperature difference between the cantilever supporting substrate and the contact portion of the n-type Si thin-film layer and metallic thin film constituting the thermocouple can be measured) and also as a thin-film heater. Also, a thin-film heater made of metallic thin film, etc. may be used. With these heating means, the thin-film cantilever is heated during the heating time around thermal time constant of the thin-film cantilever. The cooling time may be arbitrarily selected. The heating and cooling are repeated for heating over a period around the thermal time constant of the thin-film cantilever, which can serve as an excitation means utilizing warpage and bending caused by thermal expansion of the bimetal structure consisting of two main layers, which are a Si layer that is an SOI layer and a $SiO_2$ layer that is a BOX layer. In this way, the thin-film cantilever is vibrated to generate air stream in the ambient gas, and the heat conduction from the heated thin-film cantilever is facilitated so that a barometric pressure even at 1 atm or higher can be measured with high sensitivity.

First Embodiment

FIG. 1 relates to a heat conduction type barometric sensor according to the present invention and is a schematic plane view of an embodiment of the heat conduction type sensor chip 100 manufactured with the substrate 1 having an SOI layer, and further comprising a thin-film heater 25 as a heating means. Here, as a thin film 10 that is thermally separated from the substrate, a cantilever-shaped thin film (for example, 700 μm in length) is used which consists of two main layers of an SOI layer (for example, 10 μm in thickness) (Si layer) projected from the substrate 10 and a BOX layer (silicon oxide film layer) consisting of $SiO_2$ layer (for example, 1 μm in thickness) below the SOI layer as a cantilever 15 in the cavity 40, and that said thin film 10 is divided into a thin film 10A and a thin film 10B. Further, an excitation means is formed to Bimorph-vibrate the cantilever 15 based on the difference in thermal expansion coefficients between the two layers. In addition, the thin film 10B is projected in the form of a cantilever 15 from the thin film 10A with the intervention of the thermal resistance part 45b. Further, the thin film 10A is also protected from the substrate 1 in the form of a cantilever with the intervention of another thermal resistance part 45a. In addition, these thermal resistance parts 45a, 45b with narrow widths because of each of silts 42a, 42b formed on the thin film 10 make the heat conduction to the substrate 1 small to increase a temperature change. In the thin film 10A, on the thin film of an n-type diffusion area (SOI layer) that diffuses impurities with higher concentration as they are degenerated, the thermocouple 24a (thin-film temperature sensor (THA)) consisting of a second thermocouple conductor 121a and a first thermocouple conductor 120a such as nickel thin film, etc. is formed as a temperature sensor 20. Also, it is configured to be operated as a thermocouple heater that is the thin-film heater 25 of the heating means. In addition, the thermocouple 24b (thin-film temperature sensor (THB)) formed on the thin film 10B is a current detection type thermocouple and has the same structure as the thermocouple 24a. An ohmic contact 29b is formed close to the thin film 10A, and therefrom towards the substrate 1, it is guided to an electrode pad 71a by wiring 110 that uses the same metallic material as the first thermocouple conductor 120b of the thermocouple 24b. Thus, the thermocouple 24b formed on the thin film 10B measures the temperature difference, with the ohmic contact 29b of the thin film 10B close to the temperature of the thin-film heater 25 formed on the thin film 10A as a reference (generally, it is a hot junction since it is near the heater), from there to an ohmic contact 29'b that is a cool junction of the thermocouple 24b formed on the thin film 10B at the end portion of the cantilever 15 (since a temperature is lowered than the heater side). The thermocouple 24b formed on the thin film 10B can detect the temperature difference with high sensitivity using the electrode pad 71a and the electrode pad 71b if it is performed as a current detection type thermocouple.

An operation where the structure of the heat conduction type barometric sensor as shown in FIG. 1 is applied to a thin-film Pirani vacuum sensor is explained as follows. When Joule heating the thin film 10A with the thin-film heater 25 (thermocouple heater) formed on the thin film 10A (levitating in the air) as a heating means, the thermal resistance part 45a of the thin film 10A has the largest resistance. Thus, the most heated area is the thin and long thermal resistance part 45a close to the substrate (heat is mainly generated at the n-type diffusion area 21 where resistance is large). Further, in the case of high-degree vacuum, for example $10^{-4}$ Pa, the heating is controlled by flowing an intermittent square wave current pulse so as for the temperature to be higher about 100° C. for example than ambient temperature Tc. Here, the thin film 10B is projected from the thin film 10A in a cantilever shape. Thermal radiation by radiation is very small at around 100° C.

Thus, in high-degree vacuum, the temperatures of the thin film 10B and the thin film 10A are almost equal to each other. That is, in high-degree vacuum, the temperature difference between the thin film 10B and the thin film 10A is almost zero. The thermoelectromotive force of the thermocouple 24b of the thin film 10B is zero. Thus, the short-circuit current becomes zero if it is used as a current detection type thermocouple. As such, the null method that can measure with high precision can be applied if the thermocouple 24b of the thin film 10B is used as a current detection type thermocouple that measures only the temperature difference based on the thin film 10A. Thus, in particular, in high-degree vacuum, the degree of vacuum can be measured with high precision. In addition, with regard to the temperature of the thin film 10A, the temperature immediately before ceasing of the heating can be measured by ceasing the heating of the thin-film heater 25 (thermocouple heater), operating the thin-film heater 25 as the original thermocouple, and measuring the temperature immediately or a little while thereafter. The null method can be applied by this measurement of temperature.

The thermal time constant of the thin film 10 is small, for example as small as 25 msecs, since the thin film is thermally separated from the substrate and the thermal capacity is small. In this case, a square wave current is flown about 30 msecs slightly longer than 20 msecs that is the thermal time constant of the thin film 10A so as for the temperature of the thin film 10A to be almost 100° C. by square wave current supply with respect to the thin-film heater 25. The current supply ceases for as long as about 30 msecs interval to have a cooling period. If heating and cooling of the thin film 10 are repeated with such repeated intermittent current heating, the thin film 10 consisting of the cantilever 15 shaped thin film 10A and thin film 10B is bent upward from the surface of the substrate 1 before heating. However, because of heating, silicon (Si) that is an SOI layer 11 has a large thermal expansion coefficient and thus it elongates, whereas the silicon oxide film (SiO$_2$ layer) that is a BOX layer has a very small thermal expansion coefficient with respect to elongation and thus its size hardly changes. Consequently, like bimetal using thermal expansion, the cantilever 15 shaped thin film 10 is bent so as to return to the surface of the substrate 1 and performs Bimorph vibration. As such, due to the vibration caused by the difference in thermal expansion between the two layers as an excitation means of the cantilever 15 shaped thin film 10, in the region where barometric pressure is higher than vacuum near 1 atm, Pirani vacuum sensor, etc. hardly has sensitivity in the case of high pressure near 1 atm. In the heat conduction type barometric sensor of the present invention, forced convection is generated when the thin film starts vibrating when the heating means starts to heat the thin film, or generated by means of vibration caused in the process of cooling when the heating means stopped heating the thin film, to facilitate the heat transmission from the heated cantilever 15 shaped thin film 10 heated. Thus the heat conduction type barometric sensor of the present invention can have high sensitivity even at 1 atm or higher.

Figure 2:
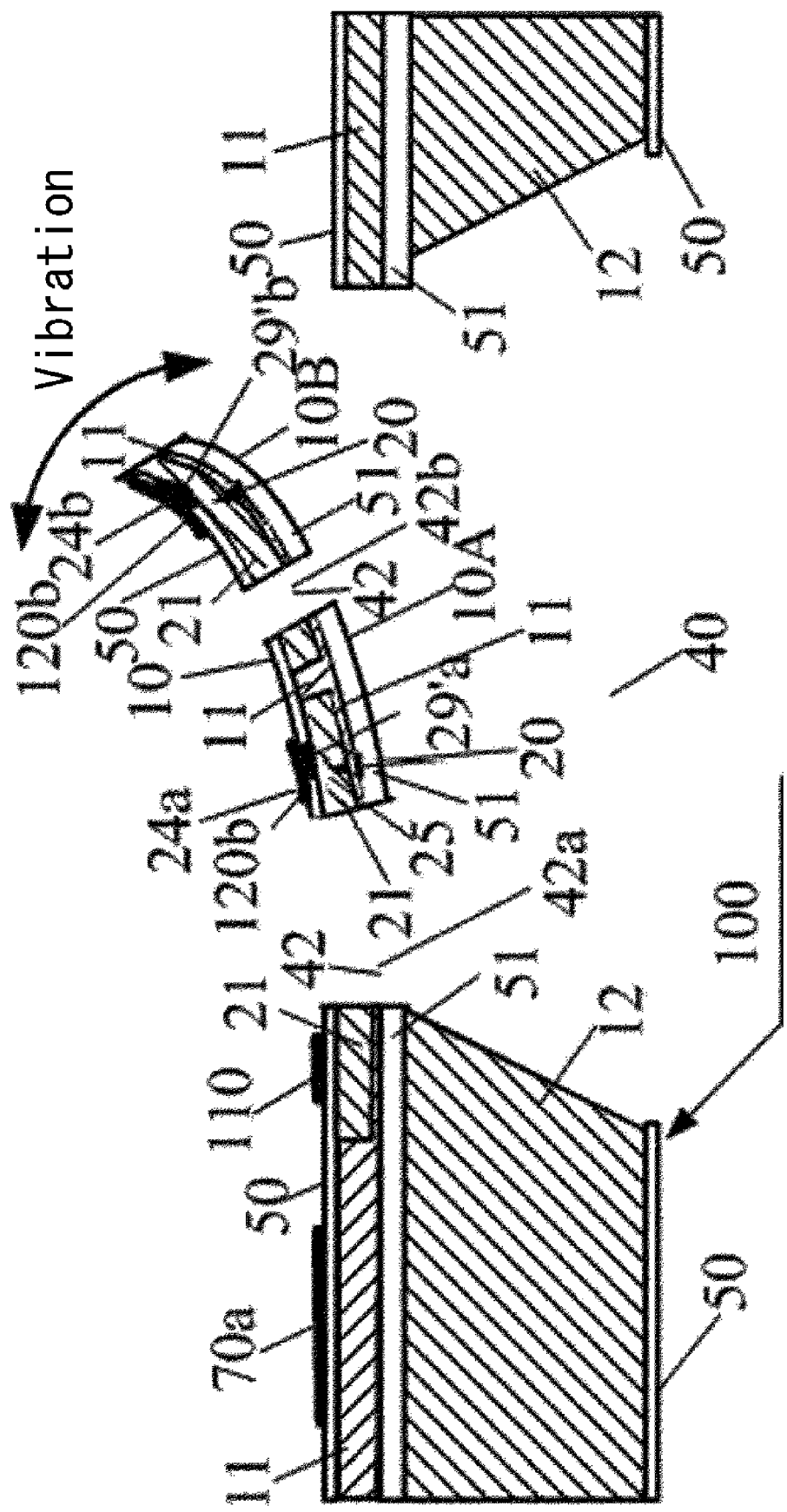
FIG. 2 is a schematic cross-sectional view taken along line X-X of the heat conduction type barometric sensor of the present invention illustrated in FIG. 1 (First Embodiment).

FIG. 2 is a schematic cross-sectional view taken along line X-X of the heat conduction type barometric sensor of the present invention as shown in FIG. 1, and shows that the cantilever-shaped thin film 10 is being vibrated by the heating and cooling of a thin-film heater 25 as a thermocouple heater formed thereon. FIG. 2 illustrates that the thin film 10 consisting of the cantilever 15 shaped thin film 10A and thin film 10B is being vibrated by a p-type SOI layer 11 with the thickness about 10 µm (actually, high concentration n-type diffusion area 21 is formed therein) and a BOX layer (silicon oxide layer) 51 being bent because of significant thermal expansion coefficient difference. The n-type impurity (phosphorus, etc.) is heat diffused in this p-type SOI layer 11 in high concentration to form an n-type diffusion area (SOI layer) 21, and a thermocouple 24 that is used for a temperature sensor 20 as a temperature difference sensor is formed.

Further, the n-type diffusion area (SOI layer) 21 formed on the p-type SOI layer 11 is suitable at a temperature of about 100° C. since pn junction electrically separates the thin-film heater 25 as a thin-film heater from the thermocouple 24b formed on the thin film 10B. Also, for example, insulation separation in the silicon oxide film (SiO$_2$ layer), not electric separation by pn junction, may be used.

The heating and cooling are repeated by using the thin-film heater 25, which results in vibrating the cantilever 15 shaped thin film 10 up and down (Bimorph vibration), and generating air stream in ambient gas. The cooling of the cantilever-shaped thin film 10 heated is accordingly facilitated, and the thermocouple 24b formed on the cantilever-shaped thin film 10B gets cooler as it is closer to the end portion of the cantilever. Thus the temperature difference gets larger so can be detected with high sensitivity. In this cooling process, generated air stream is bigger as barometric pressure of ambient gas gets higher, and thus the heated cantilever-shaped thin film 10 easily cools down. In this way, while conventional thin film Pirani vacuum sensors hardly have any sensitivity near 1 atm or higher barometric pressure region, the heat conduction type barometric sensor of the present invention generates air stream by excitation vibration caused by heating expansion and thereby the cooling of the heated thin film 10 is facilitated, which allows measurement of barometric pressure near 1 atm or higher without being saturated.

In the embodiment explained above, a cantilever 15 is used for a thin film 10 that is configured to levitate in the air in order to be thermally separated from the substrate 1. However, it is not necessarily a cantilever 15, but a bridge shape which supports both ends crosslinking the cavity 40 or a diaphragm structure formed on the cavity 40 also may be used.

Second Embodiment

Figure 3:
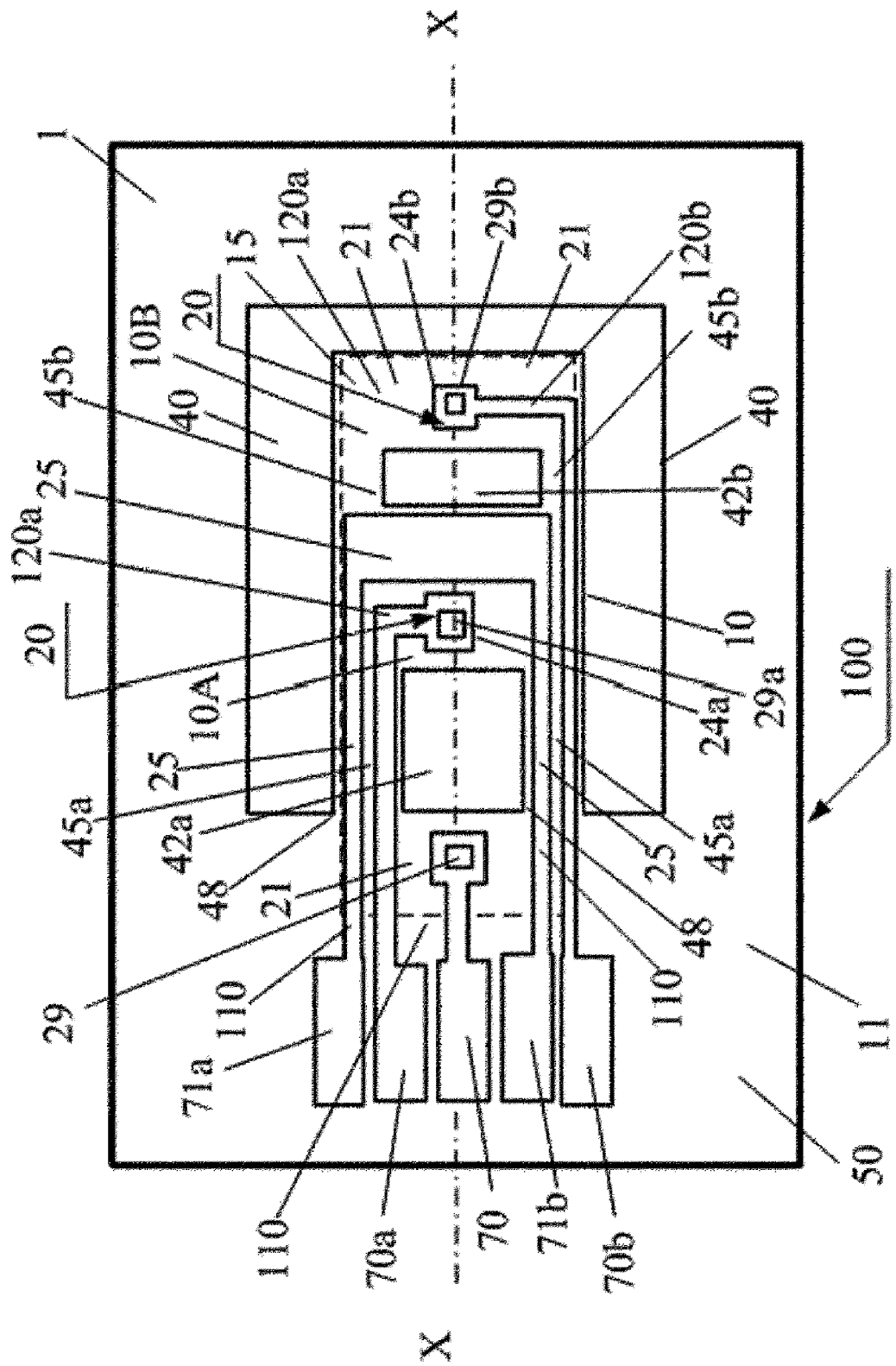
FIG. 3 is a schematic plane view of another embodiment of the heat conduction type sensor chip 100 of the heat conduction type barometric sensor of the present invention (Second Embodiment).

FIG. 3 represents another embodiment of the heat conduction type barometric sensor chip 100 of the heat conduction type barometric sensor of the present invention, which is almost the same as that of FIG. 1. They are the same in forming a thermocouple 24a (thin-film temperature sensor (THA)) and a thermocouple 24b (thin-film temperature sensor (THB)) on the thin film (A) and the thin film (B), respectively, which are formed by dividing a thin film 10 that is thermally separated from a substrate by the intervention of the thermal resistance part 45b therebetween. However, the main differences are that the thin film 10 thermally separated from the substrate is designed such that a cold junction of the thermocouple that is the thermal reference is formed on the substrate 1; that the same electrode pad 70 is used for the sharing ohmic contact 29 as the cold junction of these two thermocouples; that a second thermocouple conductor 121a, 121b for each of the thermocouple 24a and the thermocouple 24b is formed on the same SOI layer to be the same n-type diffusion area; that a thin-film heater 25 is independently formed from the thermocouple 24a on the thin film (A) close to the substrate 1 in the cantilever-shaped thin film 10; that thus, during the heating of the thin-film heater 25, the difference of output between the thermocouple 24a and the thermocouple 24b can be obtained between their electrode pad 70a and electrode pad 70b, and the temperature difference between the thin film (A) and thin film (B) can be obtained; that the thin-film heater 25 is formed with metallic thin film such as nicrom thin film, etc. whose temperature coefficient of resistance is very small, and extends beyond the substrate support 48 of the cantilever-shaped thin film 10; and that the thermal resistance part 45a of the thin film 10 is also heated so that warpage and bending caused by the large difference in thermal expansion coefficients of the heated thin film 10 is large.

One advantage of this embodiment lies in that, for the thin film (A) and the thin film (B) that are formed closer to the end side area than the thin-film heater 25 by intervening the thermal resistance part 45b in the cantilever-shaped thin film 10 and dividing the thin film 10 into two thin films, gas molecules which steal heat are very small, and thus the temperature difference between the thin film (A) and the thin film (B) is zero, which means that they have the same temperature. Thus, the null method that is a measurement method with high precision can be applied, during the heating with the thin-film heater 25. Thus the high vacuum of about $1 \times 10^{-3}$ Pa can be measured.

Another advantage lies in generating forced convection by the difference in thermal expansion coefficients effective at around 1 atm (about $1 \times 10^5$ Pa) or higher barometric pressure to have sensitivity even at high barometric pressure. In this way, high barometric pressure can be measured with high sensitivity by ceasing the heating of the thin-film heater 25 and measuring the temperature difference between the thin film (A) and the thin film (B) during the cooling using the thermocouple 24a and thermocouple 24b formed respectively on them. Further, there is a peak of the temperature difference between the thin film (A) and the thin film (B) during the cooling in that the thin film (A) closer to the substrate 1 cools down faster, whereas the thin film (B) having the thermal resistance part 45b slowly cools down, and that as time passes, the temperatures of both of the thin film (A) and thin film (B) are lowered and close to initial ambient temperature, and thus there is no temperature difference. The size of the peak is facilitated under forced convention and depends on the pressure of gas. It is confirmed from experiments that at barometric pressure at about $0.1 \times 10^5$ Pa (0.1 atm) or higher, the barometric sensor is effective.

Third Embodiment

Figure 4:
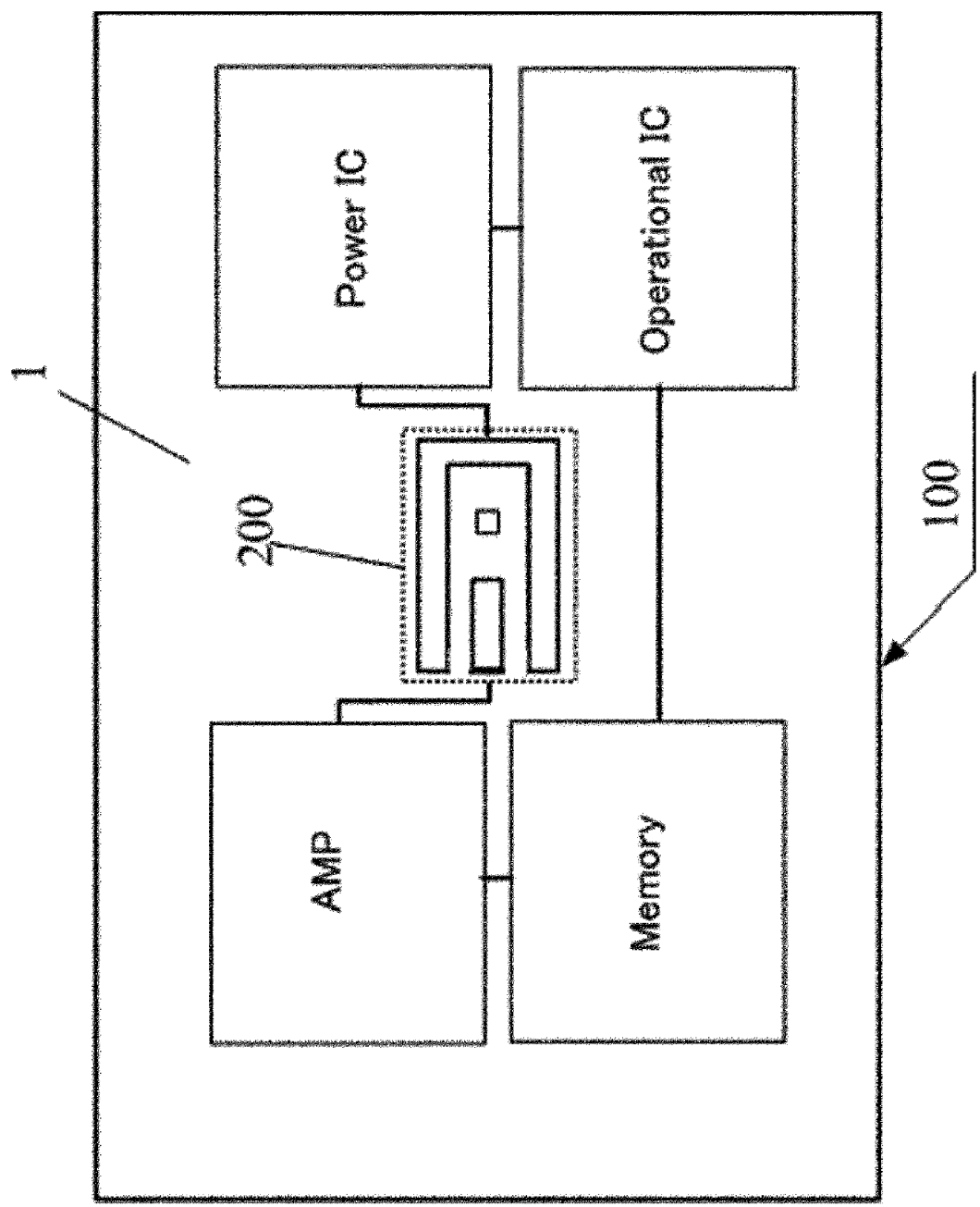
FIG. 4 relates to a heat conduction type barometric sensor according to the present invention and is a schematic plane view of another embodiment of the heat conduction type sensor chip 100 (Third Embodiment).

FIG. 4 relates to a heat conduction type barometric sensor according to the present invention and is a schematic plane view of another embodiment of the heat conduction type sensor chip 100 manufactured by using the substrate 1 such as silicon semiconductor, etc., and comprising a thin-film heater 25 as a heating means and a temperature sensor 20, wherein at least part of circuits required for operation of the heat conduction type barometric sensor are integrated in the same substrate 1. FIG. 4 illustrates that on the same substrate 1 of monocrystalline silicon, in addition to a sensing part 200 of the cantilever-shaped heat conduction type sensor having a thin-film heater 25 as a heating means and a temperature sensor 20, an amplifier (AMP) comprising an OP AMP amplifying signals relevant to barometric pressure to be measured from the temperature sensor such as a thermocouple, a power integrated circuit (Power IC) for supplying power to the thin-film heater, a memory circuit (Memory) storing data, and an operational amplifying circuit (Operational IC) for converting into barometric pressure based on the data, etc. are equipped. As such, by mounting some of the circuits required for operation of the heat conduction type barometric sensor on the same silicon substrate, a very compact heat conduction type barometric sensor can be built so that signals can be wirelessly transmitted and received from a distant place.

Thus, if this kind of chips are set at a plurality of places where measurements are made and each of the individual chips of the heat conduction type barometric sensors is recognized wirelessly, the chips can be managed centrally. Also, the degree of vacuum can be controlled by operation of it in connection with a control system such as the exhaust system.

Fourth Embodiment

Figure 5:
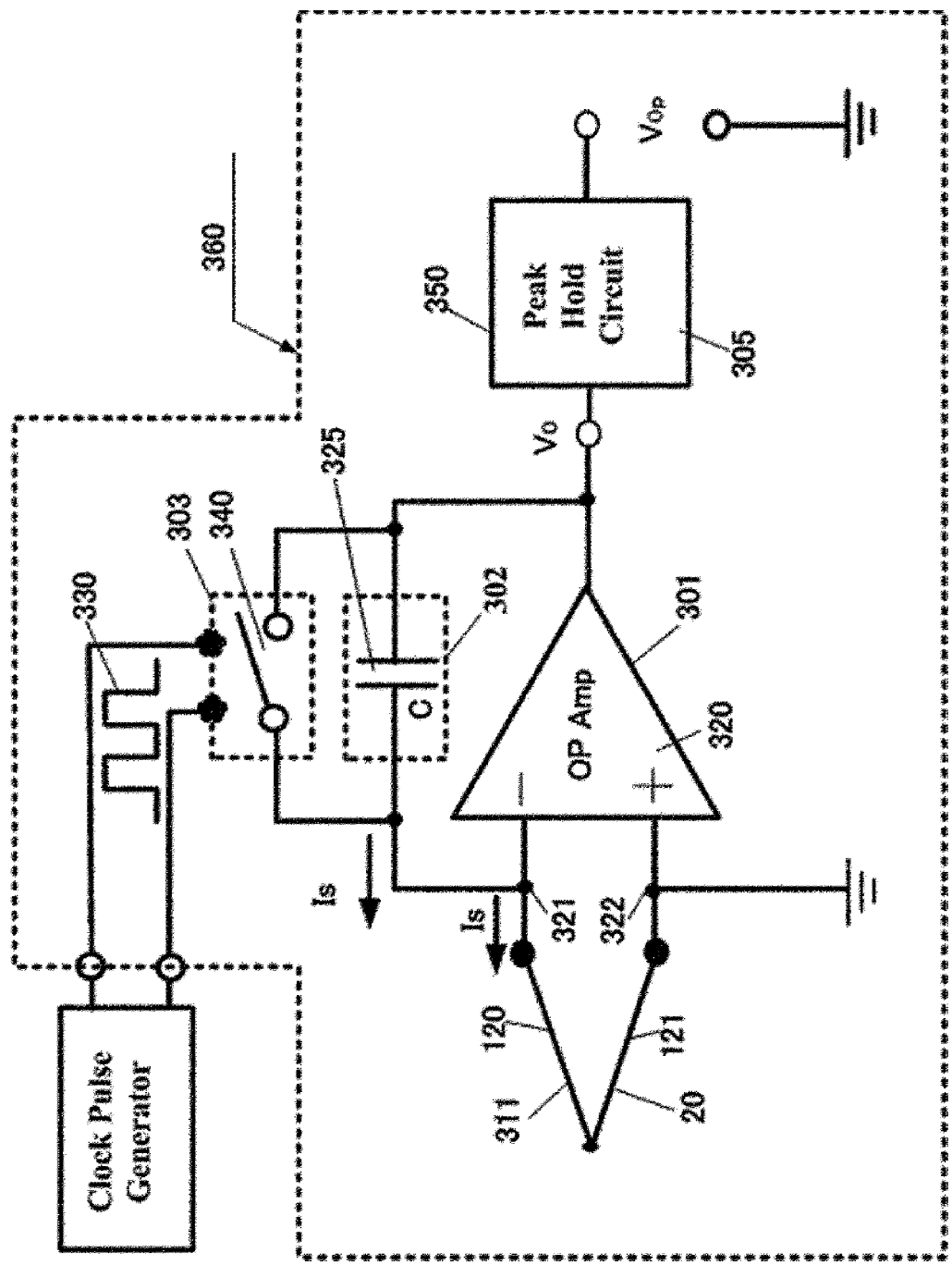
FIG. 5 relates to a heat conduction type barometric sensor according to the present invention and is a schematic view of an embodiment of a circuit capable of measuring barometric pressure with high sensitivity (Fourth Embodiment).

FIG. 5 relates to a heat conduction type barometric sensor according to the present invention and is a schematic view of an embodiment of a circuit wherein an output of the temperature sensor is set to be an output current, the output current is integrated during a predetermined period of time to measure barometric pressure with high sensitivity. FIG. 5 illustrates that a short-circuit current Is based on thermoelectromotive force from a thermocouple (or thermopile) 311 that is a temperature difference sensor as a temperatures sensor 20 as illustrated in FIG. 1 or FIG. 3 is generated by using the virtual short-circuit of an operational amplifier (OP AMP) 320 as a short-circuit current measurement means 301, to store electric charge in proportion to the current during a predetermined time $\Delta t$ in a condenser C 325 as an integral means, which is connected between the inverting input terminal and output terminal of the operational amplifier (OP AMP) 320, and that the voltage at both ends of the condenser C 325 occurring from the electric charge is observed as an output voltage Vo. With regard to the predetermined time $\Delta t$, the timing is determined by using a clock pulse 330 generated by a Clock Pulse Generator that is formed externally, and the electric charge stored in the condenser C 325 is charged or discharged by using a switch 340 located within a time setting means. At zero electric charge (initial state), the output voltage Vo is zero. When the switch 340 is off, the charging is initiated and the electric charge is stored during that period, and the output voltage Vo that is the voltage at both ends of the condenser C 325 increases. But, when the switch 340 is on, the discharging is initiated through the switch 340, and the electric charge is drained out and it returns to the initial state. As such, the output voltage Vo is represented by dividing the product of the short-circuit current Is and the time $\Delta t$ by the size C of the condenser C 325. Generally, unlike signals, in the case of time-averaging of noises, positive components offset negative components for it to be zero. Thus, by charging a short-circuit current Is in the condenser C 325 for a predetermined time $\Delta t$, the signal to noise ratio (S/N ratio) increases and a signal which is stable and whose S/N ratio is large can be amplified. The output voltage Vo that is a voltage at both ends of the condenser C 325 is an output voltage corresponding to the electric charge that integrates the short-circuit current Is during a predetermined time $\Delta t$, which varies with the time t, and becomes greatest when the predetermined integral time $\Delta t$ has passed. After that, when the switch 340 is on, the voltage rapidly heads for zero for discharge. Thus, in order to stably indicate the maximum value of the output voltage Vo, a peak hold circuit 350 as a voltage output means 305 is connected to the latter part of the operational amplifier (OP AMP) 320, and a stable output voltage $V_{Op}$ as direct current is output to be used for computation data of barometric pressure to be measured. Also, it is desirable to measure a short-circuit Seebeck current Is based on the temperature difference between the thermocouple 24a (thin-film temperature sensor (THA)) and the thermocouple 24b (thin-film temperature sensor (THB)) as the temperature sensor 20 illustrated in FIG. 1 or FIG. 3.

Figure 6:
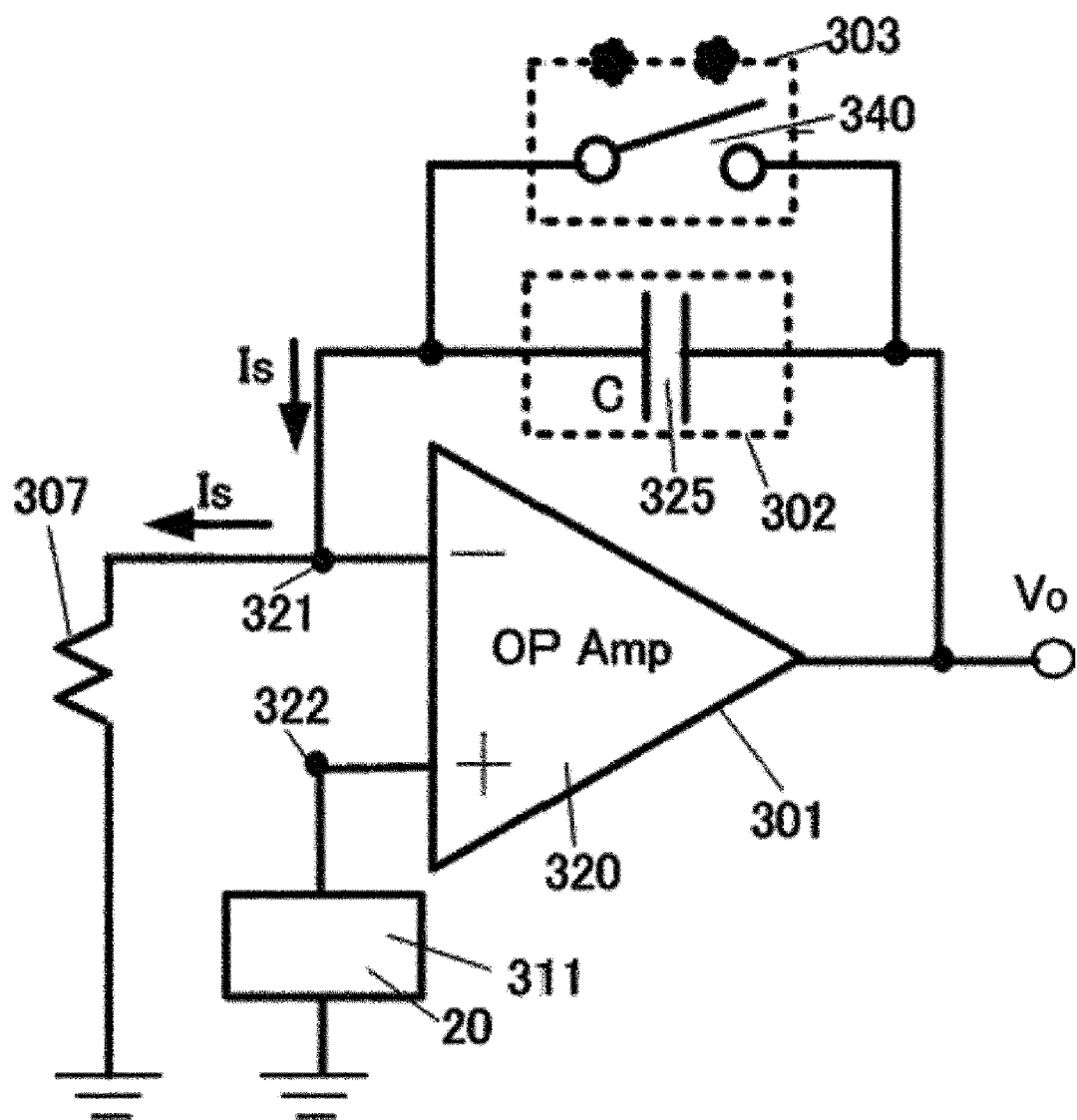
FIG. 6 is a schematic view of an embodiment of a circuit using an operational amplifier 320 of FIG. 5 as a non-inverting amplifier, focusing on vicinity of its input terminal (Fourth Embodiment).

FIG. 6 focuses on the vicinity of the input terminal of the operational amplifier (OP AMP) 320 of FIG. 5 in the case of using the operational amplifier (OP AMP) 320 of the short-circuit current measurement means 301 of FIG. 5 as a non-inverting amplifier, and does not show other portions of the circuit. FIG. 6 illustrates that a resistance 307 smaller than the internal resistance of the thermocouple or thermopile 311 is connected to the inverting input terminal 321 of the input terminals that are virtual short circuit, and it is set to be a circuit for detecting an equivalent short-circuit Seebeck current where the equivalent short-circuit current Is gets bigger, and that between the non-inverting input terminal 322 providing almost only a potential where a current does not flow and a ground connection, the thermopile 311 or thermocouple as a temperature sensor 20 is connected. The operation in this case is almost the same as in FIG. 5, and thus the explanation thereon is omitted.

Fifth Embodiment

Figure 7:
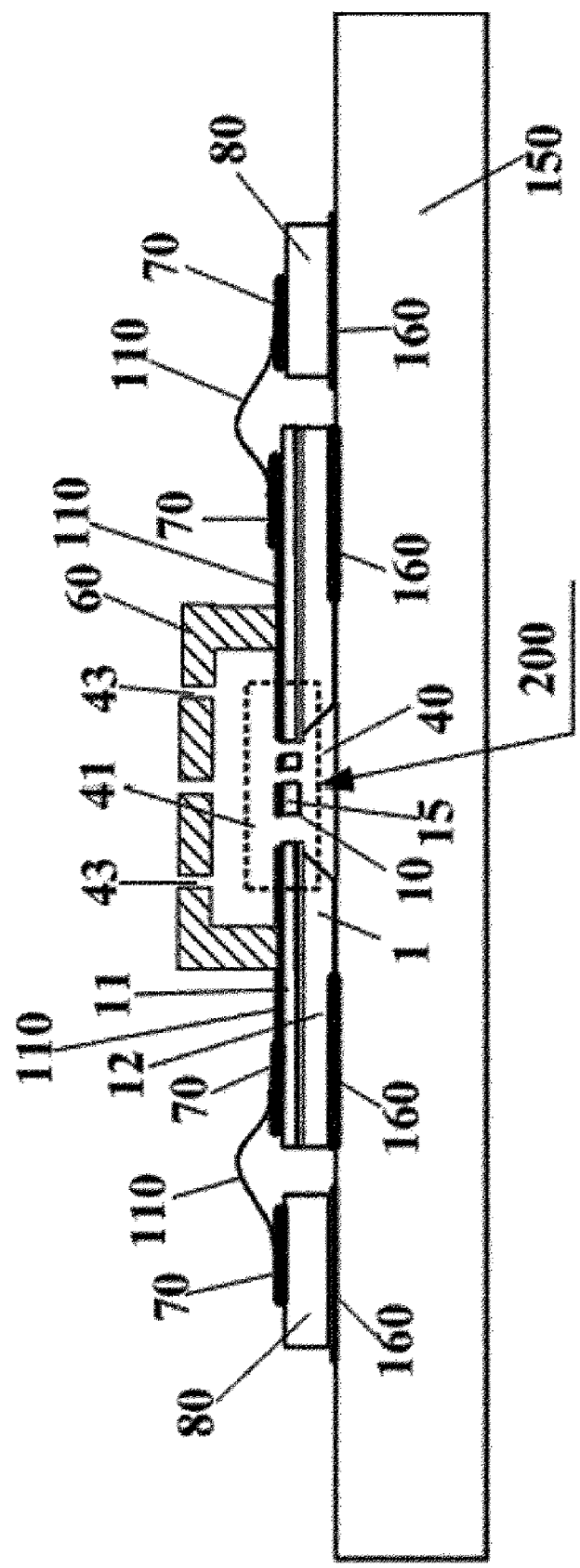
FIG. 7 relates to a heat conduction type barometric sensor according to the present invention and is a schematic cross-sectional view of an embodiment wherein a cap 60 is formed on the substrate 1 comprising a heat sink 150 (Fifth Embodiment).

FIG. 7 relates to a heat conduction type barometric sensor according to the present invention and is a schematic cross-sectional view of a heat sink 150 and an embodiment of a substrate 1 of the heat conduction type sensor in the case where a cap 60 is formed on the substrate 1. A cap 60 having holes 43 so as to cover a temperature sensor 20 and a thin-film heater 25 that is a heating means, which are formed on the substrate 1, is formed to mitigate air stream during vacuum exhaust, etc. and to prevent air stream from directly contacting a sensing part 200 of the heat conduction type barometric sensor. Thus, the cap 60 is configured not to seal, but has several holes 43 formed on it to disturb flow of ambient gas during vacuum exhaust, etc.

As for the cap 60 with holes 43, materials such as metal for example, aluminum plate, etc. or plastic, etc. can be used. As for the heat sink 150, materials with excellent heat conductivity are suitable, and copper plate or aluminum plate is suitable. As for the connecting material 160 between the substrate 1 and the heat sink 150, metallic materials with excellent heat conductivity are most preferable. Here, FIG. 7 illustrates that a wiring 110 is formed by the intervention of the electrode pad stands 80 that is an electric insulator on the heat sink 150. Here, other lead lines, etc. are not shown.

FIG. 7 illustrates an embodiment of a cap 60 formed on the substrate 1, but the cap 60 may be formed on the heat sink 150, for example, or may cover them.

Sixth Embodiment

Figure 8:
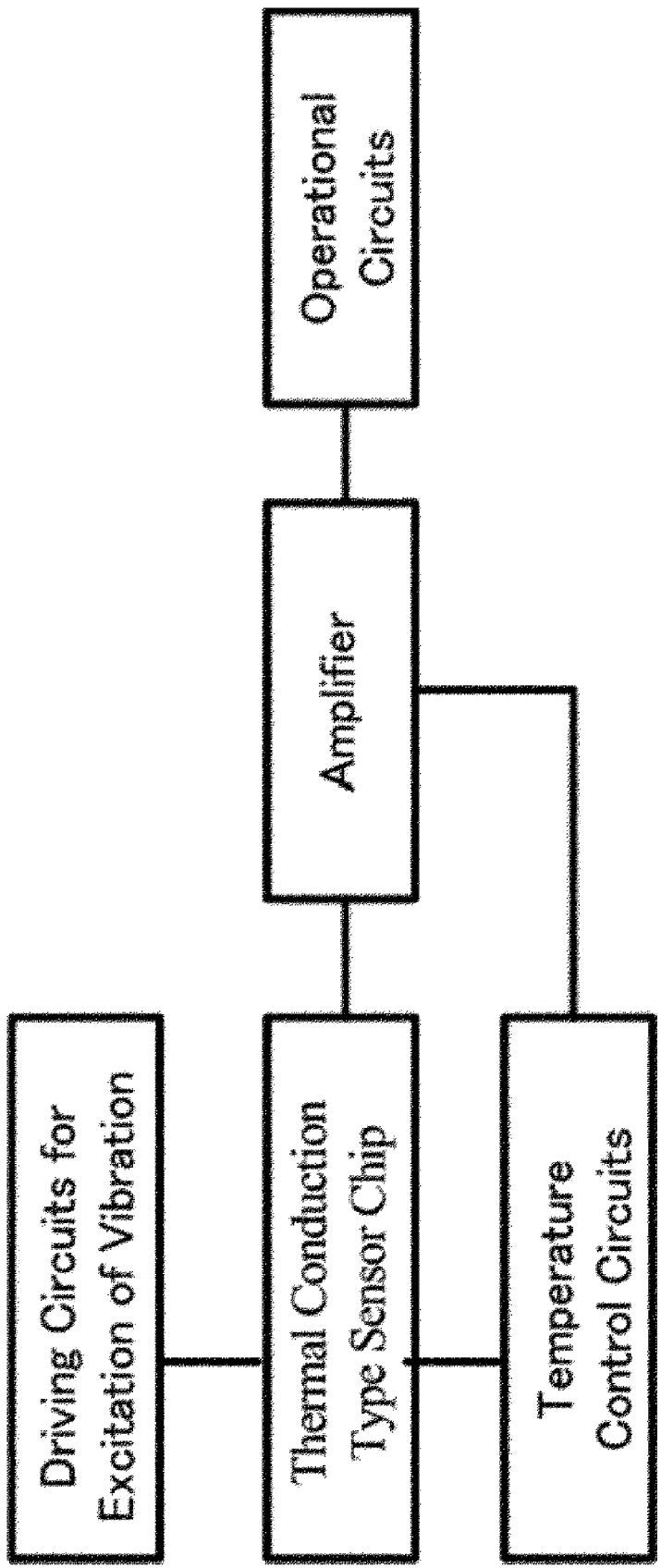
FIG. 8 relates to a heat conduction type barometric sensor according to the present invention and is a schematic block diagram of an embodiment of its system configuration (Sixth Embodiment).

FIG. 8 relates to a heat conduction type barometric sensor according to the present invention and is a schematic block diagram of an embodiment of the system configuration. Here, a system configuration is shown where temperature control circuits controlling the temperature of the heating means, driving circuits for excitation of vibration, an amplifier for amplifying signals from the temperature sensors, and operational circuits converting to barometric pressure using the output of the amplifier are built.

Each circuit can be established according to the above embodiments or known technology. Thus, here, the explanation thereon is omitted.

Figure 9:
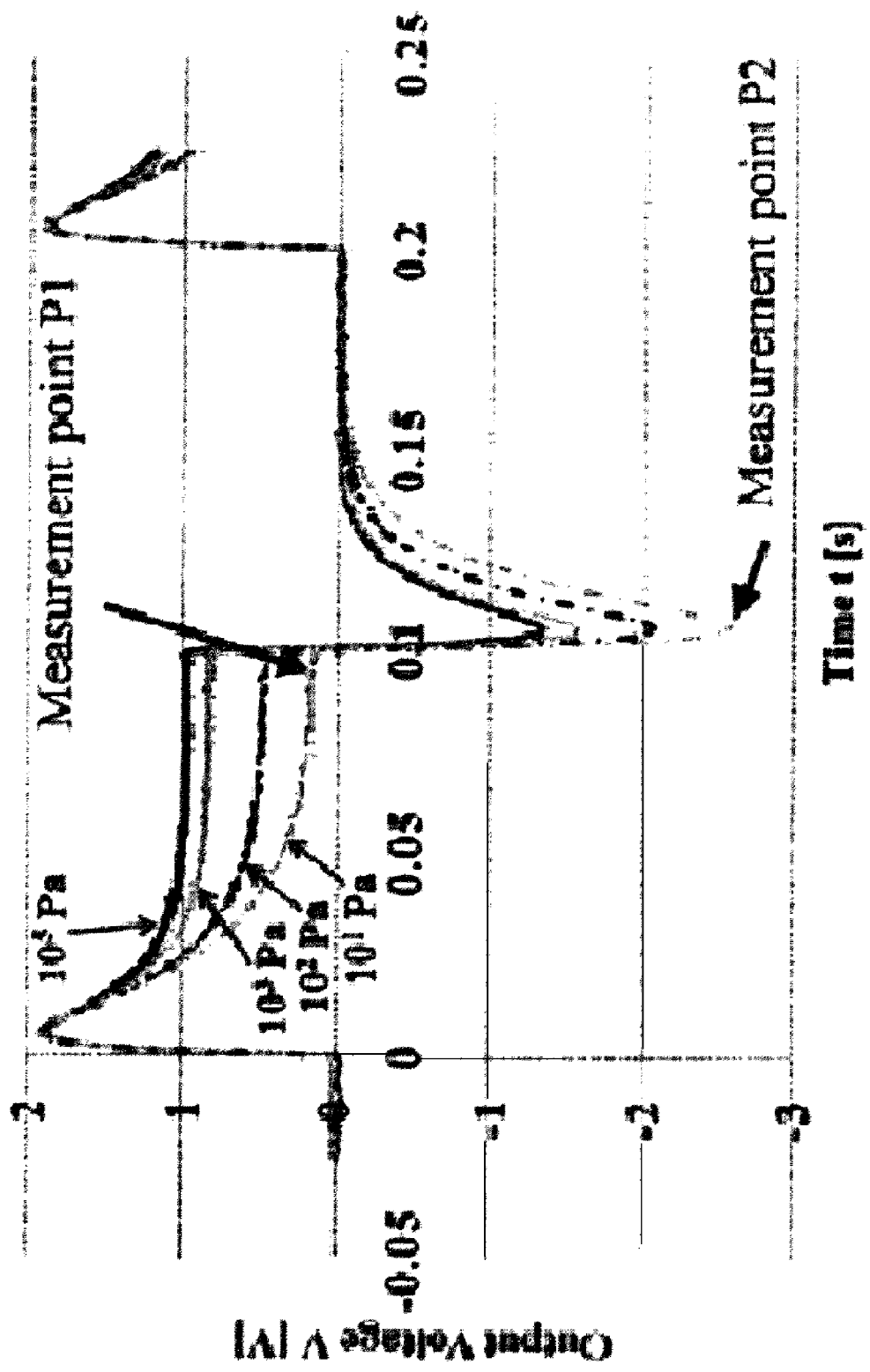
FIG. 9 shows the wave of an output voltage of a heat conduction type barometric sensor according to the present invention in case of heating during 100 msecs and cooling during 100 msecs.
Figure 10:
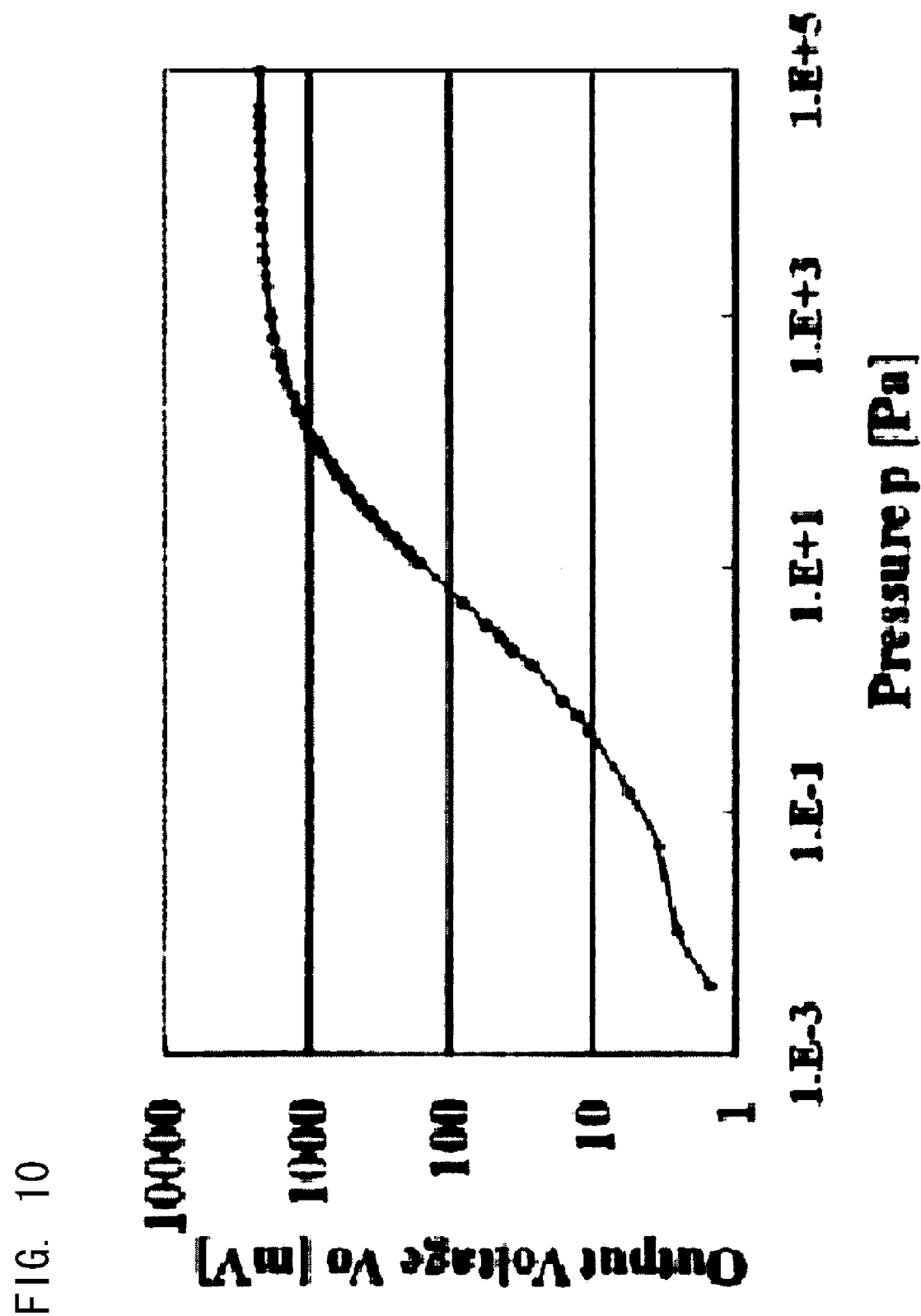
FIG. 10 shows the relationship between a pressure and an output voltage of a heat conduction type barometric sensor according to the present invention at the point of P1 of FIG. 9.
Figure 11:
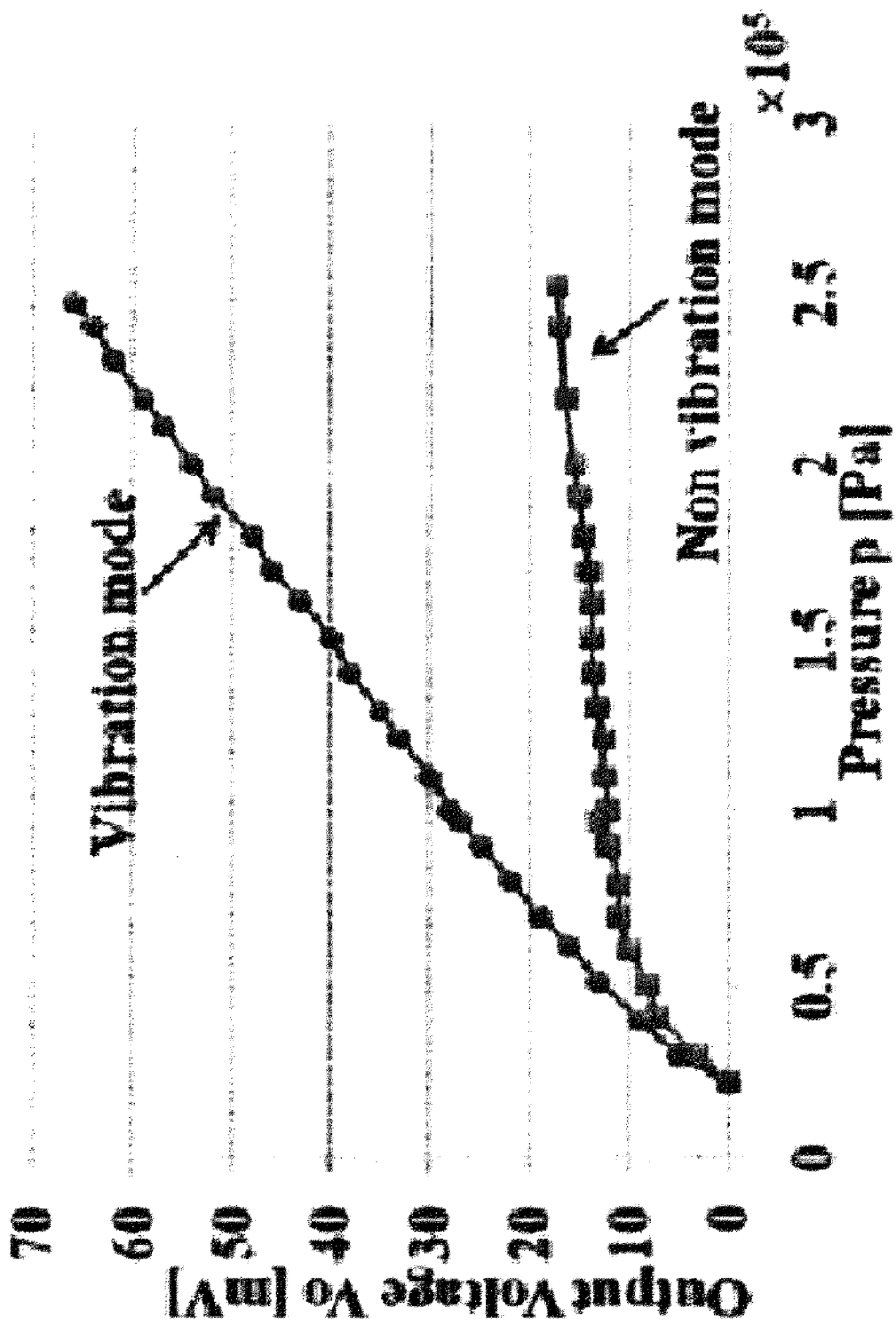
FIG. 11 shows the relationship between a pressure and an output voltage of a heat conduction type barometric sensor according to the present invention in case where there is thermal excitation and there is no thermal excitation, measured at the point of P2 of FIG. 9, which is derived from the difference in output between a thermocouple 24a and a thermocouple 24b as temperature sensors of FIG. 3 of the second embodiment which is derived from the difference in output between a thermocouple 24a and a thermocouple 24b as temperature sensors of FIG. 3 of the second embodiment.

FIG. 9 represents a wave of the output voltage of a heat conduction type barometric sensor according to the present invention in case of heating during 100 msecs and cooling during 100 msecs. FIG. 10 shows the relationship between a pressure and an output voltage of a heat conduction type barometric sensor according to the present invention at the point of P1 of FIG. 9. FIG. 11 shows the relationship between a pressure and an output voltage of a heat conduction type barometric sensor according to the present invention in case where there is thermal excitation and there is no thermal excitation, derived from the difference in output between the thermocouple 24a and thermocouple 24b as the temperature sensor of FIG. 3 of second embodiment, and measured at the point of P2 of FIG. 9.

The heat conduction type barometric sensor of the present invention is not limited to the above embodiments, but can be variously modified with the same purpose, performance and effect of the present invention.

INDUSTRIAL APPLICABILITY

The heat conduction type barometric sensor of the present invention that has simple structure and circuit configuration can measure barometric pressure near 1 atm (about $1 \times 10^5$ Pa or higher with high sensitivity and high precision, which cannot be measured by conventional heat conduction type barometric sensors and can measure very wide scope of the barometric pressure down to very low barometric pressure of $1 \times 10^{-3}$ Pa that is high degree vacuum (8 digits or more) using a single heat conduction type sensor chip. Thus, besides performing as a vacuum sensor, it is expected that the heat conduction type barometric sensor of the present invention can perform as a barometric sensor for the measurement of a high pressure, such as a sensor of inflation pressure of vehicles, etc.

REFERENCE NUMERAL

1: substrate
10, 10A, 10B: thin film
11: SOI layer
12: lower substrate
15: cantilever
20: temperature sensor
21: n-type diffusion area (SOI layer)
24, 24a, 24b: thermocouple
25: thin-film heater
29, 29a, 29'a, 29b, 29'b: ohmic contact
40, 41: cavity
42, 42a, 42b: slit
43: hole
45, 45a, 45b: thermal resistance part
48: substrate support portion
50: silicon oxide layer
51: BOX layer (silicon oxide layer)
60: cap
70, 70a, 70b: electrode pad
71, 71a, 71b: electrode pad
80: electrode pad stands
100: heat conduction type sensor chip
110: wiring
120, 120a, 120b: first thermocouple conductor
121, 121a, 121b: second thermocouple conductor
150: heat sink
160: connecting material
200: sensing part of heat conduction type sensor
301: short-circuit current measurement means
302: integral means
303: time setting means
305: voltage output means
307: resistance
311: thermocouple (or thermopile)
320: operational amplifier (OP AMP)
321: inverting input terminal
322: non-inverting input terminal 325: condenser C
330: clock pulse
340: switch
350: peak hold circuit
360: detector part of temperature difference by Seebeck current integral

The invention claimed is:

1. A heat conduction type barometric sensor comprising a thin film thermally separated from a substrate, the thin film having at least one thin-film temperature sensor, a heating means for heating the thin film, and a excitation means that vibrates the thin film, the heat conduction type barometric sensor characterized in that the thin film consists of two or more thin-layers that have at least different expansion coefficients, the excitation means utilizes warpage and bending based on a difference in thermal expansions between two main layers constituting the thin film during intermittent heating by the heating means, and based on the warpage and bending, either the temperature difference generated by forced convection generated when the thin film starts vibrating when the heating means starts to heat the thin film, or the temperature difference generated by forced convection using vibration caused in the process of cooling when the heating means stopped heating the thin film, is measured, and a heat transmission from the heated thin film to an ambient gas is facilitated so that temperature change of the thin-film temperature sensor is increased, and the increased temperature change enhances measuring sensitivity to barometric pressure to be measured.

2. The heat conduction type barometric sensor as claimed in claim 1, characterized in that the thin film has a cantilever shape.

3. The heat conduction type barometric sensor as claimed in claim 2, characterized in that the thin film comprises two main layers of silicon layer and silicon oxide layer, the motion of the warpage and bending is caused by utilizing the difference in thermal expansion coefficients between the silicon layer and the silicon oxide layer.

4. The heat conduction type barometric sensor as claimed in claim 2 characterized in that a thin-film heater is used as the heating means.

5. The heat conduction type barometric sensor as claimed in claim 1, characterized in that a thermocouple is used as the temperature sensor.

6. The heat conduction type barometric sensor as claimed in claim 5, characterized in that the thin film comprises two main layers of silicon layer and silicon oxide layer, the motion of the warpage and bending is caused by utilizing the difference in thermal expansion coefficients between the silicon layer and the silicon oxide layer.

7. The heat conduction type barometric sensor as claimed in claim 5 characterized in that a thin-film heater is used as the heating means.

8. The heat conduction type barometric sensor as claimed in claim 1, characterized in that the thin film comprises two main layers of silicon layer and silicon oxide layer, the motion of the warpage and bending is caused by utilizing the difference in thermal expansion coefficients between the silicon layer and the silicon oxide layer.

9. The heat conduction type barometric sensor as claimed in claim 1 characterized in that a thin-film heater is used as the heating means.

10. The heat conduction type barometric sensor as claimed in claim 9, characterized in that the thin-film heater is formed in the thin film thermally separated from the substrate at a position closer to a substrate support portion than the temperature sensor.

11. The heat conduction type barometric sensor as claimed in claim 1, characterized in that a conductor having not more than 1000 ppm/K of temperature coefficient of resistance is used for the thin-film heater.

12. The heat conduction type barometric sensor as claimed in claim 1, characterized in that a thermocouple is also used as a heater for the thin-film heater.

13. The heat conduction type barometric sensor as claimed in claim 1, characterized in that the thin film thermally separated from the substrate is divided into at least two of thin film (A) and thin film (B) by intervening of a thermal resistance part, each of the thin film (A) and the thin film (B) is provided with thin-film temperature sensor (THA) and thin-film temperature sensor (THB), respectively, and barometric pressure is measured from the temperature difference between the thin-film temperature sensor (THA) and the thin-film temperature sensor (THB).

14. The heat conduction type barometric sensor as claimed in claim 13, characterized in that both of the thin-film temperature sensor (THA) and the thin-film temperature sensor (THB) are of thermocouple.

15. The heat conduction type barometric sensor as claimed in claim 13, characterized in that in low barometric pressure region having no effect of forced convection by the vibration of the thin film, a barometric pressure is measured from the temperature difference between the thin-film temperature sensor (THA) and the thin-film temperature sensor (THB) in the heating state of the thin-film heater, and in high barometric pressure region having effect of forced convection by the vibration of the thin film, a barometric pressure is measured from the temperature difference between the thin-film temperature sensor (THA) and the thin-film temperature sensor (THB) in the state immediately after heating operation of the thin-film heater is ceased.

16. The heat conduction type barometric sensor as claimed in claim 1, characterized in that at least part of circuits required for operation of the heat conduction type barometric sensor is integrated in the substrate.

17. The heat conduction type barometric sensor as claimed in claim 1, characterized in that a cap provided with mesh or hole covers at least the temperature sensor and the heating means formed on the substrate such that it does not seal up but only disturb flow of ambient gas, and therefore gas flow has no direct contact with the temperature sensor and the heating means.

18. The heat conduction type barometric sensor as claimed in claim 1, characterized in that an output of the temperature sensor is set to be an output current, the output current is integrated during a predetermined period of time to be converted to an output voltage, and the output voltage is used for obtaining barometric pressure to be measured.

19. The heat conduction type barometric sensor as claimed in claim 1, characterized in that a temperature control circuit for controlling the temperature of the heating means, an excitation driving circuit for driving the excitation means, an amplifying circuit for amplifying the signal from the temperature sensor, and an operation circuit for converting an output of the amplifying circuit into barometric pressure are also incorporated.

20. The heat conduction type barometric sensor as claimed in claim 2, characterized in that a thermocouple is used as the temperature sensor.

* * * * *

UNITED STATES PATENT AND TRADEMARK OFFICE
CERTIFICATE OF CORRECTION

PATENT NO. : 8,453,501 B2
APPLICATION NO. : 13/060183
DATED : June 4, 2013
INVENTOR(S) : Mitsuteru Kimura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 288 days.

Signed and Sealed this
Eighth Day of September, 2015

Michelle K. Lee
*Director of the United States Patent and Trademark Office*